(No Model.) 2 Sheets—Sheet 2.

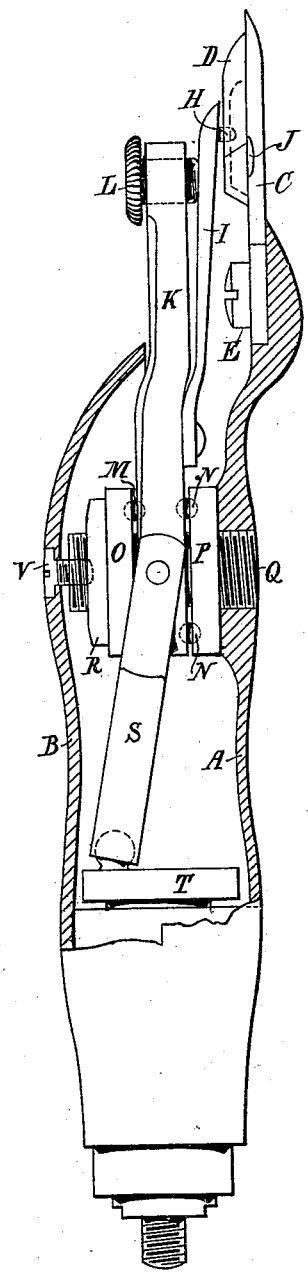
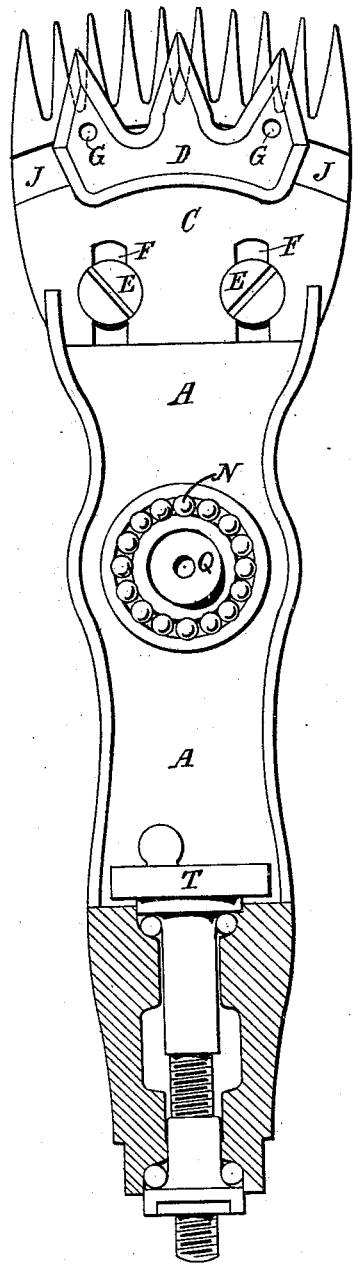

P. ASHBERRY & W. BARNES.
ANIMAL SHEARS.

No. 479,110. Patented July 19, 1892.

Witnesses.
Rob⁴ F. Drury.
Bernard E. Drury.

Inventors.
Philip Ashberry
Walter Barnes

UNITED STATES PATENT OFFICE.

PHILIP ASHBERRY AND WALTER BARNES, OF SHEFFIELD, ENGLAND.

ANIMAL-SHEARS.

SPECIFICATION forming part of Letters Patent No. 479,110, dated July 19, 1892.

Application filed March 31, 1891. Serial No. 387,149. (No model.) Patented in England May 6, 1890, No. 6,962.

*To all whom it may concern:*

Be it known that we, PHILIP ASHBERRY and WALTER BARNES, subjects of the Queen of Great Britain, residing at Sheffield, in the county of York, England, have invented certain new and useful Improvements in Mechanical Clippers for Sheep and other Animals, (patented to us in Great Britain under No. 6,962, dated the 6th day of May, 1890;) and we do hereby declare that the following is a full, clear, and exact description thereof, reference being had to the accompanying drawings, which form a part of this specification.

This invention relates to improvements in portable apparatus for clipping sheep and other animals and to that kind of such apparatus in which an oscillating or "reciprocating" cutter coacts with a relatively fixed comb carried by a suitable handle, and is driven by a suitable motor through a flexible shaft and connecting mechanism which have their bearings within or attached to such handle.

The present invention consists in certain novel combinations of parts, having for their objects, first, the pivoting of the oscillating cutter-carrier or "reciprocating arm" in such a manner that it is held between two circles of anti-friction balls without contact with any fixed part, and hence with great freedom from friction and strain, and, secondly, the adjustment of the pressure of the reciprocating cutter upon the comb without the contact of any relatively-fixed part with the cutter, except the comb against which the cutter is so pressed, and without disturbing the relative position of said reciprocating arm or the plane in which it oscillates, and thus without added friction and with great efficiency.

We have illustrated the apparatus and its mechanical parts in the annexed drawings, in which similar letters of reference indicate similar parts in any of the figures.

Figure 3:
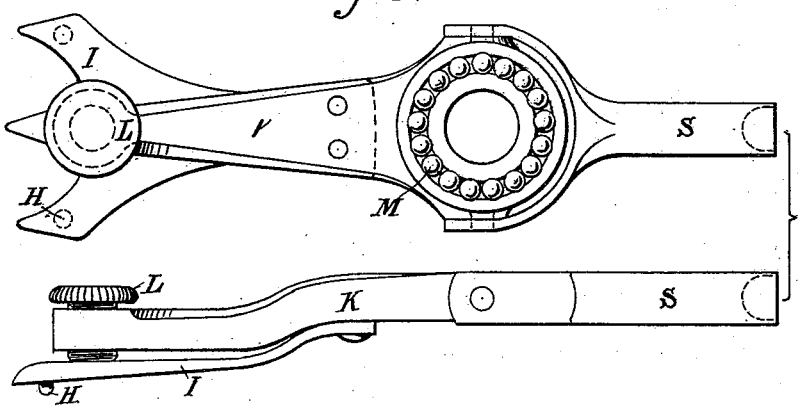
Figure 4:
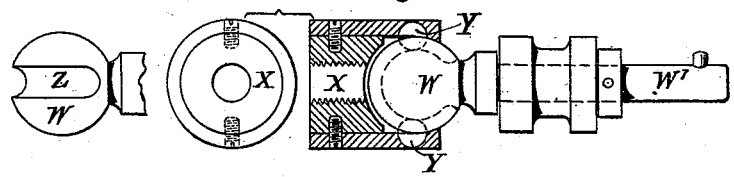
Figure 5:
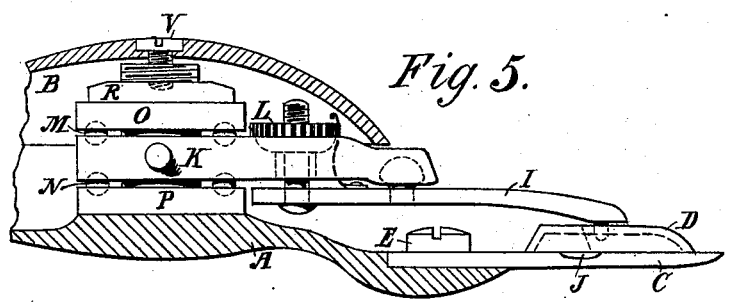
Figure 6:
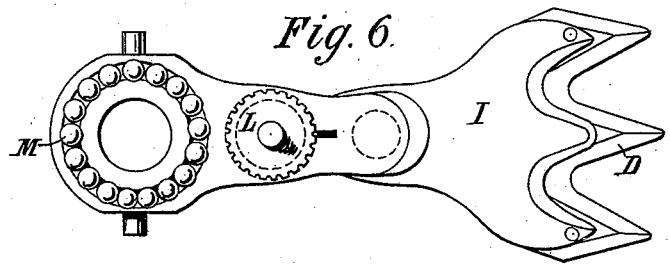

Figure 1 is a side elevation of the clipper with part of the casing cut away to show the interior. Fig. 2 is a plan, part being in section and other parts removed; Fig. 3, plan and side view of reciprocating arm and connecting-rod; Fig. 4, details of the driving-joint; Fig. 5, view of modified arrangement of reciprocating arm and tension-bar; Fig. 6, plan of same with case removed.

The apparatus consists, speaking broadly, of a semi-tubular casing and cover A and B, shaped so as to be conveniently held in the hand, having at the front end a comb-shaped bottom cutter C, hereinafter termed the "comb," on the upper face of which the reciprocating cutter D works to and fro, being driven by reciprocating mechanism inside the casing, connected with a revolving flexible shaft driven by any motive power. We propose to make the comb C to fit into the front end of the casing A, and secure it in position by screws E in open slots F, so that by slackening the screws the comb can be drawn out and replaced. We may make the cutter proper D with one or more points, but preferably three, as shown, and provided with holes G to receive corresponding studs H, projecting from the under face of a combined tension-bar and driver I. The shallow segmental groove J is merely to reduce friction between the cutter and the comb. The tension-bar and driver I is attached to the reciprocating arm K, and can be pressed down upon the cutter with any required degree of force without interfering with the adjusted position or working plane of the arm by means of the adjusting-screw L, and the screw may be fixed in position when adjusted by a spring-catch or other means. The reciprocating arm, with the carrier, is held between two circles of anti-friction balls M and N, rolling in annular grooves made in the collars O and P. These collars are carried by the vertically-screwed stud Q, secured to the casing A. We prefer to make the collar P solid with the screw; but the upper one O is provided with a screw-thread, and is therefore adjustable in its height, and when by setting it down upon the balls the proper pressure is put upon the arm K it is secured by the lock-nut R. Although the arm K has a circular reciprocating motion concentric with the stud Q, it does not bear on the stud, its action being entirely upon the balls controlled by the annular grooves, causing the minimum of friction. The reciprocating motion is imparted by a connecting-rod S, fitting upon studs or pins projecting from each side of the boss of the arm K, the opposite end of the rod engaging with the eccentric-pin of a revolving disk T. The said pin is made partly spherical and fits into a corresponding recess formed in the end of the connecting-rod. The disk T is fitted upon a short shaft fitted with an adjustable nut and working upon anti-friction balls, as shown in Fig. 2, the screwed end of the shaft projecting from the end of the casing. When the above-mentioned shaft revolves, it imparts a horizontal reciprocating motion to the arm K, the driver or carrier I and cutter D moving the cutter to and fro across the face of the comb C. The loose cover B is secured by a screw V, taking into a threaded hole in the top of the stud Q, or it may be hinged to the casing, and when closed may be secured by any suitable appliance.

As a means by which the motive power may be transmitted from the flexible shaft to the clipper, leaving the clipper free to be moved about in any direction, we have constructed a special form of coupling or universal joint. (Shown in Fig. 4.) It consists of a ball W and socket X, fitted together in the manner shown. The socket is constructed to screw firmly upon the screwed end of the shaft, which projects from the end of the casing of the clipper. The ball cannot escape from the socket, which is closed upon the ball at one end and forms a bearing or seat for it to work against.

The driving-section is made by two anti-friction balls Y, let into concave recesses formed in the inside of the socket, and also fitting into a concave groove Z, passing round the periphery of the ball W, which terminates in a short shaft $w'$, to which the end of the flexible shaft is secured.

A modified arrangement of the parts before described is shown in Figs. 5 and 6, in which the arm K is shortened, so as to bring it very nearly inside the cover B, and the driver I has a ball-shaped fulcrum fitting in the cupped end of K, the pressure or tension being applied to the cutter by turning the nut L and raising the back end of I. The nut is held where desired by a spring-catch or the like.

By the peculiar construction of our clipper and the novel adaptation of anti-friction ball-bearings to the reciprocating arm K and the driving-joint or universal joint or coupling to which the flexible shaft from the motor is attached we have materially reduced the frictional contact of such parts and have produced a compact and efficient clipper that can be worked with a minimum of power and practically without vibration or shake.

Having now particularly described and ascertained the nature of our invention and in what manner the same is to be performed, we declare that what we claim is—

1. In a mechanical clipper, the two circles of anti-friction balls M N, in combination with the ball-supporting collars O P, the central stud Q, supporting both of said collars, and a cutter-driving arm K, supported between the two circles of balls, the opposing faces of said collars and said arm having ball-retaining grooves concentric with said stud, substantially as shown, whereby said arm is adapted to oscillate freely without contact with any relatively-fixed part, for the purposes set forth.

2. In a mechanical clipper of the class set forth, the screwed stud Q, provided with the fixed collar P, internally-threaded collar O, and lock-nut R, in combination with the two circles M N of anti-friction balls supported by said collars, the cutter-driving arm K, interposed between said balls and provided in common with said collars with ball-retaining grooves concentric with said stud, a combined tension-bar and driver I, movable relatively to said arm, a reciprocating cutter engaged by said tension-bar and driver, a relatively-fixed comb against which said cutter is pressed, and adjusting devices carried by said arm and by said tension-bar and driver, whereby the latter is adjusted to regulate the tension of the cutter without disturbing said arm and the arm is adapted to oscillate freely in a given plane without contact with any relatively-fixed part whatever, substantially as hereinbefore specified.

In testimony that we claim the foregoing as our own we have affixed hereto our signatures, in presence of two witnesses, this 17th day of March, 1891.

PHILIP ASHBERRY.
WALTER BARNES.

Witnesses:
  ROBT. F. DRURY,
  BERNARD E. DRURY.